United States Patent [19]

Buma et al.

[11] Patent Number: 4,963,704

[45] Date of Patent: Oct. 16, 1990

[54] HORN SWITCH OF STEERING WHEEL

[75] Inventors: Koji Buma; Fuminori Komiya, both of Aichi, Japan

[73] Assignee: Kabushiki Kaisha Tokai Rika Denki Seisakusho, Aichi, Japan

[21] Appl. No.: 428,889

[22] Filed: Oct. 30, 1989

[30] Foreign Application Priority Data

Nov. 1, 1988 [JP] Japan ................................ 63-143668

[51] Int. Cl.⁵ ............................................. H01H 9/00
[52] U.S. Cl. ................................................ 200/61.55
[58] Field of Search ......................... 200/61.54–61.57; 74/552

[56] References Cited

U.S. PATENT DOCUMENTS

| 4,655,101 | 4/1987 | Endo et al. | 200/61.55 X |
| 4,785,144 | 11/1988 | Fosnaugh et al. | 200/61.55 |
| 4,789,763 | 12/1988 | Nagata et al. | 200/61.54 |
| 4,808,776 | 2/1989 | Niwa et al. | 200/61.55 |

Primary Examiner—J. R. Scott

[57] ABSTRACT

In a horn switch of a steering wheel having a horn circuit make and break moving contact capable of contacting with a horn circuit, a bolt, an annular washer, a coil spring, and an annular insulator, are assembled to a horn pad mounting member as a unit, the mounting member on which these components have been assembled is assembled to a steering wheel body. As a result, the components may be assembled to the body in a unified form.

5 Claims, 4 Drawing Sheets

४,९६३,७०४

HORN SWITCH OF STEERING WHEEL

BACKGROUND OF THE INVENTION

The present invention relates to a horn switch of a steering wheel mounted on a steering wheel body of a motor vehicle.

Conventionally, horn switches mounted on steering wheels have been known with various constructions. For example, as shown in FIG. 6, a horn switch is so constructed that a bracket 13, on which a horn pad is mounted, includes a horn circuit make and break moving contact 13a. The bracket 13 is mounted to a steering wheel body A so that the moving contact 13a may move with the bracket 13 to be capable of contacting with or separating from a horn circuit to make and break fixed contact. The bracket 13 has a mounting bolt 11 fed through a hold 13b thereof after the mounting bolt 11 is fed through a spacer 12. Thereafter, the mounting bolt 11 is screwed into the body through a washer 15. A horn pad return coil spring 14 is fitted on the outer circumferential surface of the bolt 11 and urged by the bias force thereof. The pad is positioned in an initial condition, that is, a condition where a horn circuit is opened. An annular insulator 16 receives the end of the steering wheel body side of the spring 14 and insulates the spring 14 from the body.

In assembling the switch, the insulator 16, the washer 15, the spring 14, the bracket 13, and the spacer 12 are assembled to the body in order and thereafter these components allow the bolt 11 to be fed through the components and then to be screwed into the body. Thus, the components are mounted to the body with the bolt 11 in a unified form to construct the horn switch.

However, each component of the horn switch is separately assembled to the body, with the result that there have been various problems such as increased assembly time and complicated assembly work.

SUMMARY OF THE INVENTION

Accordingly, an essential object of the present invention is to remedy the above-described problems and to provide a horn switch of a steering wheel which is not required to assemble components of a horn switch to a steering wheel body in order in assembling with the result that the time for assembly is reduced components may be prevented from dropping from the body and being erroneously assembled. In addition, an assembler may be prevented from forgetting the assembly of the components.

In accomplishing these and other objects, according to one preferred embodiment of the present invention, there is provided a horn switch of a steering wheel comprising; a horn pad mounting member having a horn circuit make and break moving contact capable of contacting with a horn circuit make and break fixed contact arranged at a steering wheel body, a horn pad being mounted to the mounting member; a screw member screwed into the body and permitting the mounting member to be movably mounted on the body so that the moving contact is capable of contacting with and separating from the fixed contact; a coil spring arranged between the mounting member and the body and surrounding the screw member; an annular insulator through which the screw member is fed, and which receives one end of the steering wheel body side of the spring; and an annular engaging member fixed to the screw member and engaging with the insulator while preventing the insulator from dropping from the screw member.

By the above construction of the present invention, after the screw member, the annular engaging member, the coil spring, and the annular insulator are first assembled to the horn pad mounting member as a unit, the horn pad mounting member on which these components have been assembled is assembled to the body, with the result that the components may be assembled to the body in a unified form. Thus, it may reduce the time for assembly of the body, and may effectively prevent the components from dropping from the body and being erroneously assembled, and an assembler from forgetting the assembly of the components.

Furthermore, the insulator for insulating the coil spring from the body may prevent the spring from dropping from the horn pad mounting member. Thus, even if the horn pad mounting member drops in assembling the components to the body, the components assembled to the mounting member may not be easily disassembled and may be easily handled.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
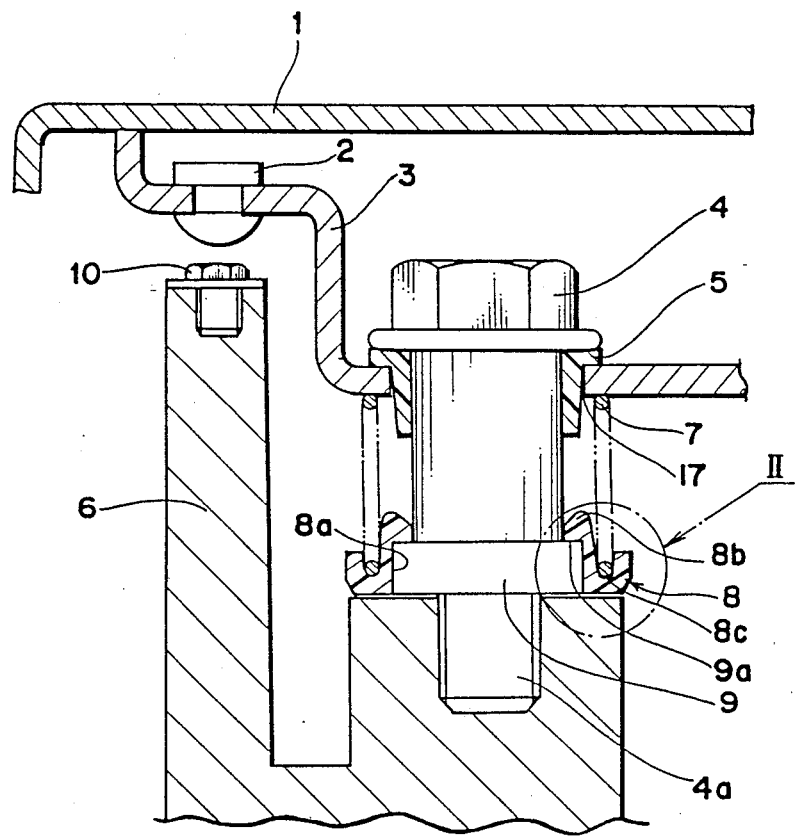
FIG. 1 is a partially enlarged sectional view of a horn switch according to one preferred embodiment of the present invention.

Before the description of the present invention proceeds, it is to be noted that like parts are designated by like reference numerals throughout the accompanying drawings.

Figure 3:
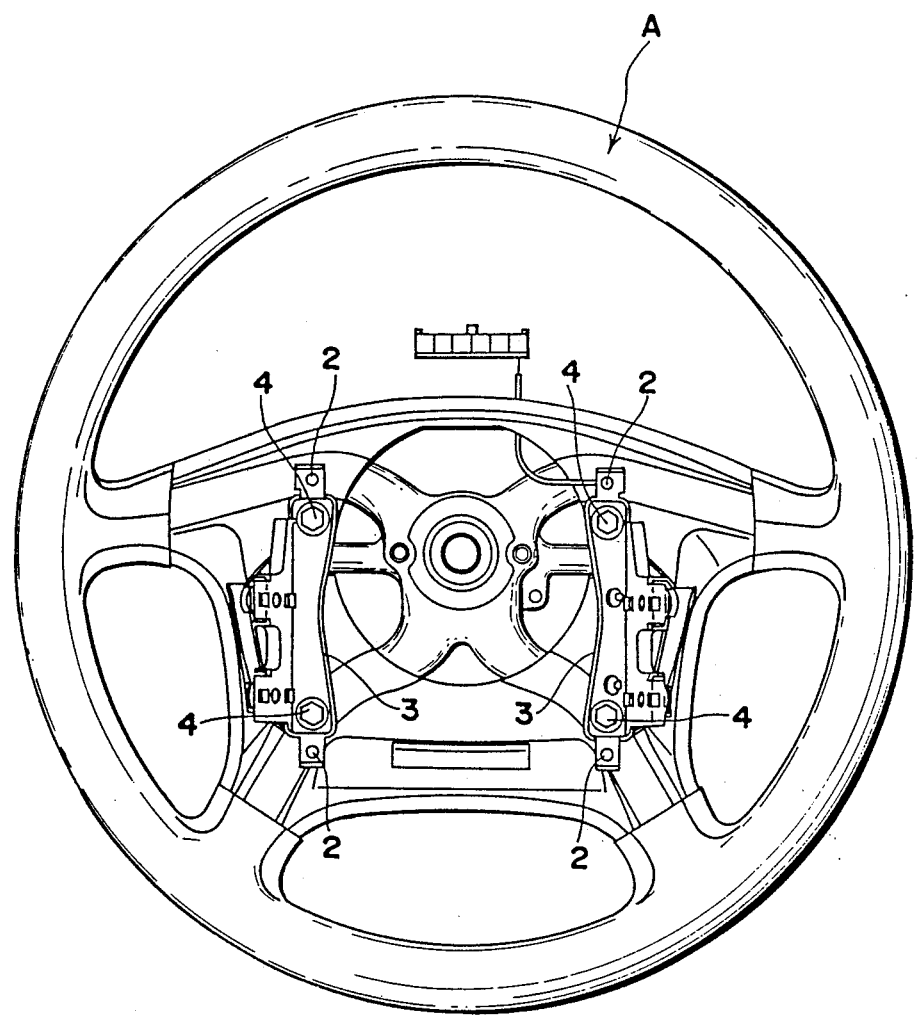
FIG. 3 is a plan view of a steering wheel to which the horn switch of the steering wheel according to the embodiment is assembled in the condition where a horn pad is removed from a steering wheel body.
Figure 4:
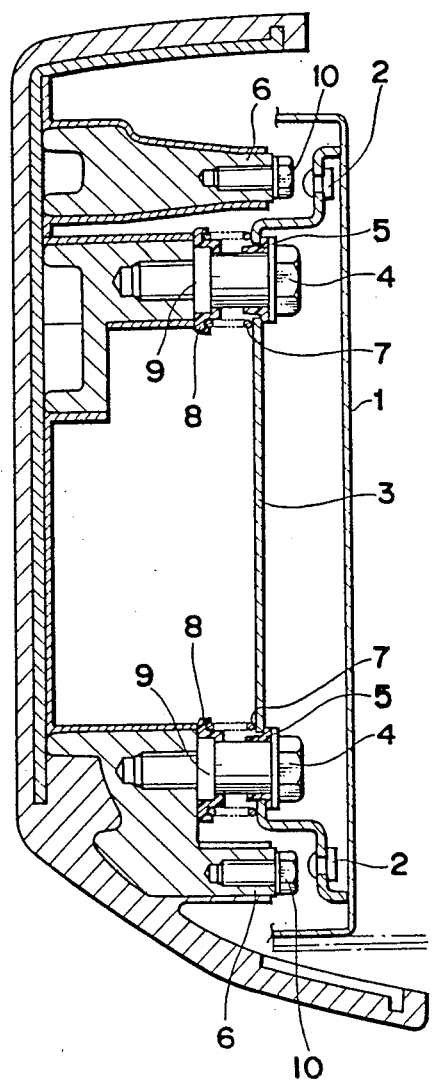
FIG. 4 is a sectional view of the wheel in the condition where the pad is mounted to the body.

As shown in FIGS. 3 and 4, in the embodiment, a horn pad 1 for being depressed by a hand of an operator is mounted to a bracket 3 serving as a horn pad mounting member at the right and left ends thereof in FIG. 3, and thus is mounted to a steering wheel body (A). In FIG. 3, horn switches are assembled to the upper and lower surface of each end of the pad 1. That is, the horn switch is mounted to the bracket 3 as follow. A shoulder bolt 4 to which a washer 9, serving as an annular engaging member, and a spacer 5 are previously assembled is fed through a through hole 17 of the bracket 3. A coil spring 7 is loosely fitted on the outer circumferential surface of the bolt 4 so that an annular member 8 constructed from an insulating material may prevent the spring 7 from dropping from the bolt 4 and may allow the spring 7 to be insulated from a steering wheel body 6. Then, the bolt 4 is screwed into the body 6 and thus the components assembled to the bracket 3 are mounted to the body 6.

The bracket 3 is an approximately rectangular, elongated metal plate positioned at both sides of the wheel (A) as shown in FIG. 3. At the bottom face of the upper and lower end portions of each bracket 3, a horn circuit make and break moving contact 2 for opening or closing a horn circuit in associated with a horn circuit make and break fixed contact 10 is arranged by release or depression of the pad 1. In the vicinity of each moving contact 2 of each bracket 3, a through hole 17 is formed penetrating in the thick direction of the bracket 3.

The cylindrical spacer 5, made of insulating material, and the washer 9 are assembled to each bolt 4. Thereafter the bolt 4 is screwed into a specified portion of the body 6.

On the other hand, the fixed contact 10 is arranged at the body 6 while confronting with each moving contact 2. Then, by pressing a desired portion of the horn pad 1, the bracket 3 moves toward the body 6 with respect to the bolt 4, and one of the four moving contacts 2 contacts with the fixed contact 10 confronting with the moving contact 2, with the result that the horn circuit is closed to activate a horn.

Each of the coil springs 7 is loosely fitted on the outer circumferential surface of the bolt 4 so as to surround the bolt 4, and then is arranged between the bracket 3 and the body 6. The end of the bracket side of each coil spring 7 contacts with the bottom surface of the bracket 3. The end of the steering wheel body side of each coil spring 7 is fitted on the outer circumferential surface of each washer 9 through the insulator 8.

Figure 2:
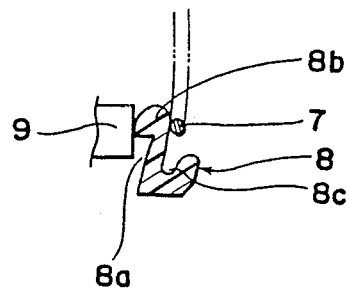
FIG. 2 is an enlarged sectional view of a part indicated by an arrow II in the condition where an annular insulator of the horn switch is being fitted onto the outer circumferential surface of a washer.
Figure 6:
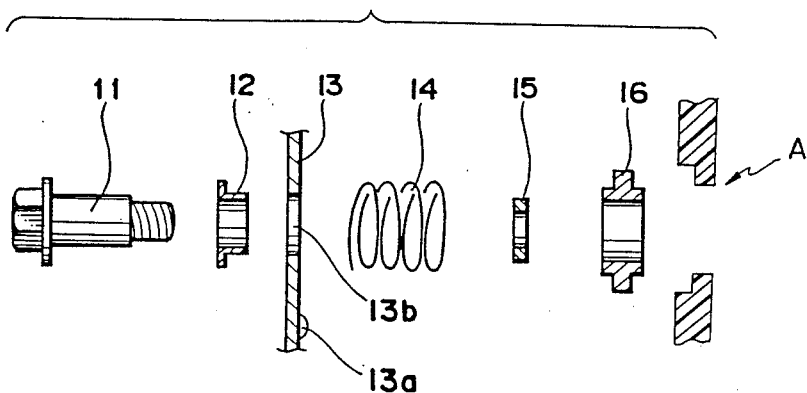
FIG. 6 is an exploded sectional view of assembly components of a conventional horn switch.

Each insulator 8 is made of flexible insulating material. Each insulator 8 has a recess portion 8c serving as a maintaining portion which is formed at the outer circumferential surface thereof and into which the end of the body side of the spring 7 is fitted, a through hole 8a into which the outer circumferential surface of the washer 9 is fitted, and an annular claw portion 8b projecting inwardly in the radial direction thereof at the end of the bracket side thereof. The insulator 8 is upwardly fitted on the bolt 4 in FIG. 1 so that the washer 9 fixed to the bolt 4 may be fitted into the through hole 8a and so that the end of the body side of the spring 7 may be fitted into the recess portion 8c. At that time, as shown in FIG. 2, after the claw portion 8b is elastically bent outwardly in the radial direction thereof, the washer 9 is completely fitted into the through hole 8a. Then, the claw portion 8b returns to be in the initial condition (referring to FIG. 1) to engage with the end 9a of the bracket side of the washer 9, with the result that the insulator 8 is in the condition where the insulator 8 is in engagement with the bolt 4 by the washer 9. That is, the washer 9 prevents the insulator 8 from dropping from the bolt 4 so that the spring 7 may be insulated from the bolt 4.

Figure 5:
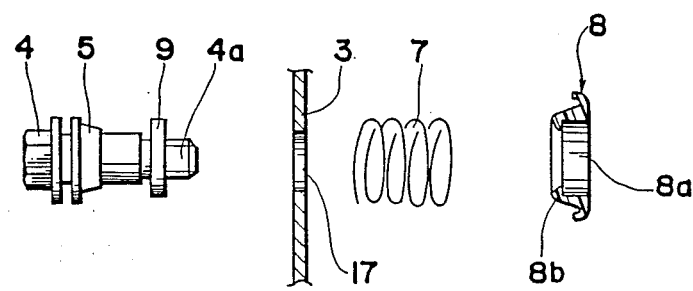
FIG. 5 is a sectional view showing the condition where the switch of the wheel is being assembled to the body.

The horn switch with the construction is assembled to the body 6 as follows (referring to FIG. 5). That is, the bolt 4 is first assembled to the spacer 5 and the washer 9. Thereafter, the bolt 4 is fed through each through hole 17 of each bracket 3 and the spring 7 surrounds the bolt 4. Then, the claw portion 8b of the insulator 8 is fitted on the washer 9. At that time, the flexible material of the insulator 8 allows the claw portion 8b to elastically bend outwardly in the radial direction thereof as shown in FIG. 2. When the washer 9 is fitted into the through hole 8a and insulator 8, the claw portion 8b returns to be in the initial condition so as to engage with the end 9a of the bracket side of the washer 9. Additionally, the one end of the spring 7 is fitted into the recess portion 8c of each insulator 8 to be received thereby. In this condition, the washer 9 prevents the insulator 8 from dropping from the bolt 4. Thus, the bolt 4, the spacer 5, the washer 9, the spring 7, and the insulator 8 are assembled to the bracket 3 into a unit so that the components such as the spacer 4, the washer 9, the spring 7, and the insulator 8 may be assembled to the body 6 in a unified form. Finally, the screw portion 4a of the bolt 4 is screwed into the body 6. Then, the assembly work of the horn switch is completed. After that, the pad 1 is fixed to the two brackets 3.

According to the embodiment, after the bolt 4, the annular washer 9, the coil spring 7, and the annular insulator 8 are assembled to the bracket 3 as a unit, the bracket 3 on which these components have been assembled is assembled to the body 6, with the result that the components may be assembled to the body 6 in a unified form. Thus, it may reduce the time for assembly to the body 6, and may effectively prevent the components from dropping from the body 6 and being erroneously assembled. Further, the components may prevent an assembler from forgetting the assembly of the components.

Furthermore, the insulator 8 for insulating the coil spring 7 from the body 6 may prevent the spring 7 from dropping from the bracket 3. Thus, even if the bracket 3 drops in assembling the components to the body 6, the components assembled to the bracket 3 may not be easily disassembled and may be easily handled.

The present invention is not limited to the embodiment described above; it can be put into practice in other various forms. For example, though each insulator 8 has the claw portion 8b engaging with the end 9a of the bracket side of each washer 9 so that the insulator 8 may engage with the washer 9, instead of this design, each washer 9 may have an engaging recess portion on the outer circumferential surface thereof and each insulator 8 may have an engaging projection portion for engaging into the engaging recess portion on the inner circumferential surface of the through hole 8a of the insulator 8, with the result that the engaging projection portion engages into the engaging recess portion. Conversely, each washer 9 may have an engaging projection portion on the outer circumferential surface thereof and each insulator 8 may have an engaging recess portion for engaging with the engaging projection portion on the inner circumferential surface of the through hole 8a thereof, with the result that the engaging projection portion engages into the engaging recess portion.

Furthermore, though the recess portion 8c of the insulator 8 is arranged at the body side of the insulator 8 with respect to the claw portion 8b thereof in the above-described embodiment, the recess portion 8c may be arranged at the bracket side of the insulator 8 with respect to the claw portion 8b.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A horn switch of a steering wheel comprising:
a horn pad mounting member having a horn circuit make and break moving contact capable of contacting with a horn circuit make and break fixed contact arranged at a steering wheel body, a horn pad being mounted to said mounting member;
a screw member screwed into the body and permitting said mounting member to be movably mounted on the body so that the moving contact is capable of contacting with and separating from the fixed contact;
a coil spring having a first end and a second end, said first end being disposed adjacent to said mounting member and said second end being disposed adjacent to said steering wheel body, said coil spring surrounding said screw member;
an annular member including an aperture through which said screw member is fed, said annular member being disposed adjacent to said second end of said coil spring; and
an annular engaging member mounted on said screw member and engaging said aperture of said annular member to prevent said annular member from dropping from said screw member.

2. A horn switch of a steering wheel according to claim 1, wherein said annular member includes a maintaining portion adapted to receive said second end of said spring and a claw portion projecting inwardly in a radial direction thereof and engaging with said annular engaging member.

3. A horn switch according to claim 1, wherein said annular member is constructed from an insulating material.

4. A horn switch according to claim 2, wherein said maintaining portion is a recess for receiving said second end of said coil spring.

5. A horn switch according to claim 2, wherein said claw portion extends around said aperture of said annular member for engaging and securing said annular member relative to said annular engaging member.

* * * * *